UNITED STATES PATENT OFFICE.

HERMANN JANSSEN, OF ELBERFELD, GERMANY, ASSIGNOR TO THE FARBEN-FABRIKEN OF ELBERFELD COMPANY, OF NEW YORK.

BISMUTH COMPOUND AND PROCESS OF MAKING SAME.

SPECIFICATION forming part of Letters Patent No. 620,141, dated February 28, 1899.

Application filed September 28, 1898. Serial No. 692,059. (No specimens.)

*To all whom it may concern:*

Be it known that I, HERMANN JANSSEN, doctor of philosophy, chemist, of Elberfeld, Germany, (assignor to the FARBENFABRIKEN OF ELBERFELD COMPANY, of New York,) have invented a new and useful Improvement in Pharmaceutical Compounds; and I hereby declare the following to be a clear and exact description of my invention.

My invention relates to the production of a new bismuth compound containing bromin and iodin by allowing dibromgallic acid to act at elevated temperatures on bismuthoxyiodid.

In carrying out my new process practically I can proceed as follows, (the parts being by weight:) A bismuthoxyiodid paste which has been freshly prepared in the usual manner from 9.6 parts of bismuth nitrate is mixed with twenty parts of water and 6.9 parts of crystallized dibromgallic acid. The reaction mixture is slowly heated with continuous stirring, the red color of the mixture thus being by and by changed into brown. At about 60° centigrade a development of carbon dioxid takes place, which becomes very strong on heating the mixture to from 70° to 80° centigrade. When the development of carbon dioxid has ceased, the mixture is allowed to cool. The brown precipitate thus obtained is filtered and purified by washing with water. Finally it is filtered off, dried at ordinary temperature, and pulverized. The new compound thus obtained is a brown powder, insoluble in benzene and ligroin. It is decomposed by alkalies. When treated with cold alcohol, it is partially dissolved under decomposition. The alcoholic solution thus obtained has a yellowish-red color.

The new compound is a valuable remedy against various skin diseases. It is used especially as a wound antiseptic.

Having now described my invention and in what manner the same is to be performed, what I claim as new, and desire to secure by Letters Patent, is—

1. The process for producing a new bismuth compound containing bromin and iodin, which process consists in first heating a mixture of bismuthoxyiodid and dibromgallic acid at from 60° to 80° centigrade until the development of carbon dioxid has ceased, secondly filtering off the reaction mixture, which may be further purified and finally drying the same, substantially as hereinbefore described.

2. As a new article of manufacture the new bismuth compound derived from dibromgallic acid and bismuthoxyiodid, which compound is a brown powder that is insoluble in benzene and ligroin, is decomposed by alkalies, dissolves partially in alcohol under decomposition a yellowish-red solution being thus obtained, substantially as hereinbefore described.

In testimony whereof I have signed my name in the presence of two subscribing witnesses.

HERMANN JANSSEN.

Witnesses:
 R. S. JAHN,
 OTTO KÖNIG.